(12) United States Patent
Okuno (10) Patent No.: US 11,811,981 B2
(45) Date of Patent: Nov. 7, 2023

(54) SCANNER CONFIGURED TO TRANSMIT SCAN DATA TO DESTINATION ASSOCIATED TO SHORTCUT KEY, SCANNING SYSTEM, AND NON-TRANSITORY COMPUTER-READABLE RECORDING MEDIUM CONTAINING COMPUTER-EXECUTABLE INSTRUCTIONS FOR SCANNER

(71) Applicant: BROTHER KOGYO KABUSHIKI KAISHA, Nagoya (JP)

(72) Inventor: Tetsuya Okuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/533,364

(22) Filed: Nov. 23, 2021

(65) Prior Publication Data

US 2022/0166888 A1    May 26, 2022

(30) Foreign Application Priority Data

Nov. 26, 2020    (JP) ................................ 2020-195767

(51) Int. Cl.
*H04N 1/00* (2006.01)
(52) U.S. Cl.
CPC ..... *H04N 1/00209* (2013.01); *H04N 1/00389* (2013.01); *H04N 1/00501* (2013.01); *H04N 2201/0094* (2013.01)

(58) Field of Classification Search
CPC .......... H04N 1/00209; H04N 1/00389; H04N 1/00501
See application file for complete search history.

(56) References Cited

U.S. PATENT DOCUMENTS

| | | | |
|---|---|---|---|
| 9,019,528 B2* | 4/2015 | Mihara | H04N 1/00464 358/1.14 |
| 2014/0327787 A1* | 11/2014 | Tsujimoto | H04N 1/00328 348/207.2 |
| 2017/0272594 A1* | 9/2017 | Yamada | H04N 1/0097 |
| 2018/0338054 A1 | 11/2018 | Fujiwara | |
| 2019/0089862 A1* | 3/2019 | Sugawara | H04N 1/00212 |
| 2020/0162624 A1* | 5/2020 | Tsukada | H04N 1/00217 |
| 2021/0127036 A1* | 4/2021 | Morishita | H04N 1/32368 |

FOREIGN PATENT DOCUMENTS

| | | |
|---|---|---|
| JP | 2013-131920 A | 7/2013 |
| JP | 2018-195100 A | 12/2018 |

* cited by examiner

*Primary Examiner* — Benjamin O Dulaney
(74) *Attorney, Agent, or Firm* — Scully, Scott, Murphy & Presser, P.C.

(57) ABSTRACT

An MFP includes a controller. When a short cut key is operated, the controller is configured to execute a scan process to transmit scan data to a destination associated with the short cut key. The controller determines whether the shortcut key associated with user ID is disabled in management information when information about a destination including the user ID is deleted. When determining that the shortcut key is not disabled, the controller disables the shortcut key.

11 Claims, 10 Drawing Sheets

| USER ID | DISPLAY NAME | SCAN SETTING |
|---|---|---|
| User1 | USER A | A4, 200 dpi, MONOCHROMATIC, MULTI-PAGE |
| User2 | USER B | A4, 300 dpi, COLOR, ONE-SIDED |
| User3 | USER C | A4, 200 dpi, MONOCHROMATIC, ONE-SIDED |
| ... | ... | ... |
| UserN | . . . | . . . |

| SHORTCUT ID | USER ID |
|---|---|
| Shortcut1 | User1 |
| Shortcut2 | User2 |
| Shortcut3 | User3 |
| . . . | |

SCANNER CONFIGURED TO TRANSMIT SCAN DATA TO DESTINATION ASSOCIATED TO SHORTCUT KEY, SCANNING SYSTEM, AND NON-TRANSITORY COMPUTER-READABLE RECORDING MEDIUM CONTAINING COMPUTER-EXECUTABLE INSTRUCTIONS FOR SCANNER

CROSS-REFERENCE TO RELATED APPLICATIONS

This application claims priority under 35 U.S.C. § 119 from Japanese Patent Application No. 2020-195767 filed on Nov. 26, 2020. The entire subject matter of the application is incorporated herein by reference.

BACKGROUND

Technical Field

The present disclosures relate to a technology of transmitting scan data to a particular destination.

There has been known a scanner configured to generate scan data and transmit the generated scan data to a registered destination.

SUMMARY

In some scanners of the above configuration, a destination of the scan data can be associated with a shortcut key that the user interface has. In such a scanner, the user can transmit the scan data to a designated destination by operating the shortcut key, without having to input or select the destination. On the other hand, the information about the destination associated with the shortcut key can be deleted. If the information about the user-desired destination associated with a particular shortcut key has been deleted, the scan data cannot not be transmitted to the destination even if the user operates the particular shortcut key. Further, if the particular shortcut key which has been deleted is associated with another destination, there is a concern that the scan data may be sent to a destination unintended by the user when the user operates the particular shortcut.

According to aspects of the present disclosures, there is provided a scanner configured to scan an image of an original document and generate scan data representing the image of the original document, comprising a memory, a user interface, and a controller. The controller is configured to perform storing destination information corresponding to a destination of the scan data, associating the destination information stored in the memory with a shortcut key provided to the user interface, in response to operation of the shortcut key, transmitting the scan data as generated to a destination corresponding to the destination information associated with the shortcut key, when the destination information stored in the memory is to be deleted, determining whether the shortcut key associated with the destination information to be deleted is disabled, and when it is determined that the shortcut key is not disabled in the determining, disabling the shortcut key.

DETAILED DESCRIPTION OF THE EMBODIMENTS

First Embodiment

Hereinafter, a scanning system according embodiments of the present disclosures will be described with reference to the accompanying drawings.

Figure 1:
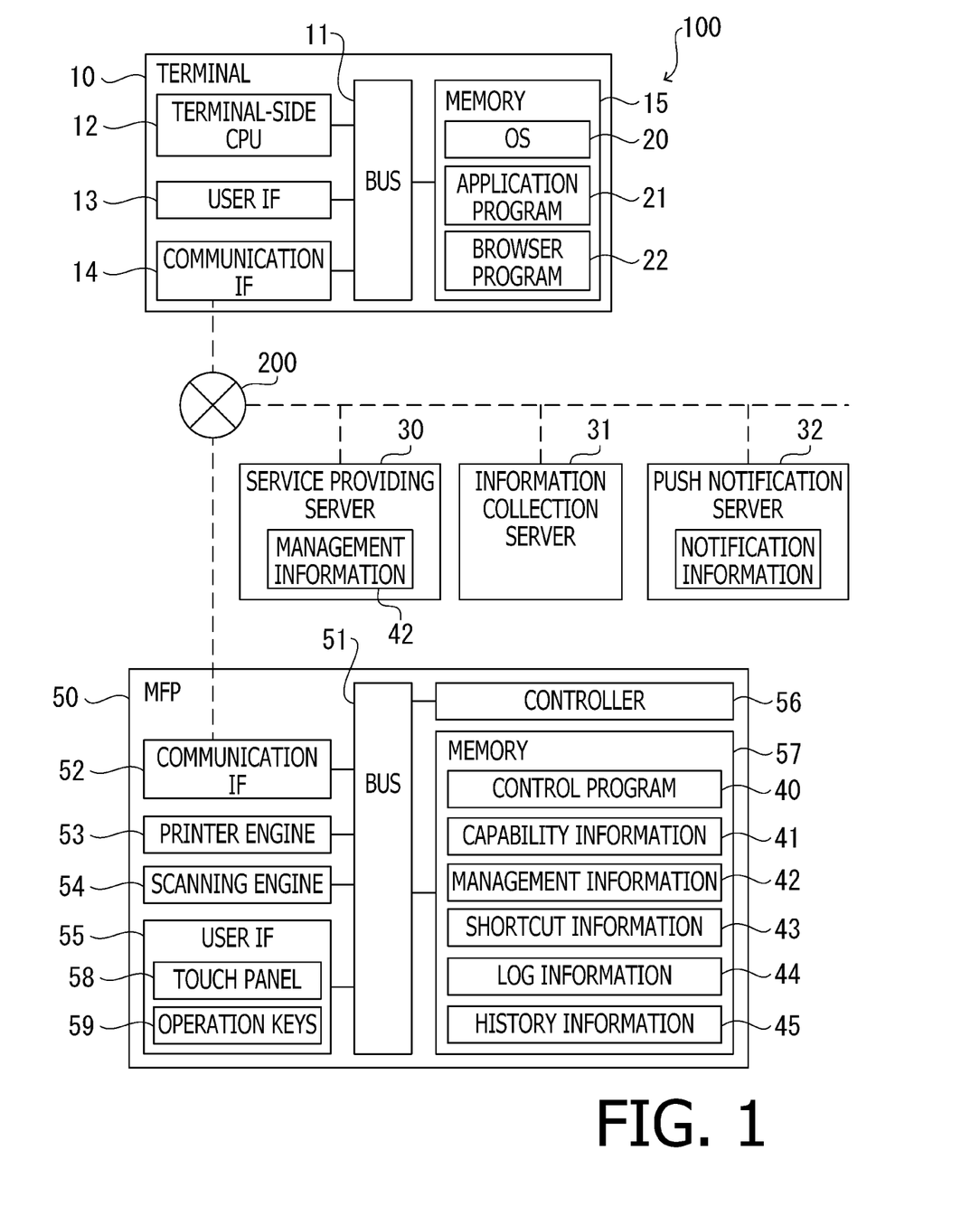
FIG. 1 is a block diagram illustrating a configuration of a scanning system according to a present embodiment.

A scanning system 100 shown in FIG. 1 has a terminal 10, servers 30, 31, 32, and an MFP (Multifunction Peripheral, Printer or Product) 50. The terminal 10, the servers 30, 31, 32, and the MFP 50 are connected to the network 200. In the first embodiment, the network 200 may be the Internet, a local area network (LAN), or a combination of a LAN and the Internet. Further, the network 200 may be wired or wireless, or may be composed of a combination of wired and wireless networks. In the present embodiment, the terminal 10 and the MFP 50 are connected wirelessly to an unshown router that forms part of the network. Further, the terminal 10 or the MFP 50 and the servers 30, 31, 32 are connected via the Internet. In the first embodiment, the MFP 50 is an example of a scanner.

A hardware configuration of the MFP 50 is described below. The MFP 50 is equipped with a bus 51, a communication IF 52, a printer engine 53, a scanner engine 54, a user IF 55, a controller 56, and a memory 57. It is noted that "IF" is an abbreviation for Interface.

The communication IF 52 connects the MFP 50 to the network 200 in accordance with a particular communication protocol. For example, the communication IF 52 is capable of performing Wi-Fi (registered trade mark) type wireless communication based on the IEEE 802.11 standard and standards compliant to the IEEE 802.11 standard. The communication IF 52 may also be capable of performing short-range wireless communication such as Bluetooth (registered trade mark) with the terminal 10.

The user IF 55 is an interface between the controller 56 and the user, and in this embodiment, the user IF 55 has a touch panel 58 and operation keys 59 as physical keys. The touch panel 58 has a touch sensor and outputs a signal according to a detection result by the touch sensor. It is noted that the term "touch" in this embodiment includes any operations of bringing an input medium into contact with a display screen of the touch panel 58. The proximity of the input medium to the touch panel 58 to the point where the distance between the input medium and the touch panel 58 is very close may also be included in the afore-mentioned concept of "touch." In addition, the input medium may be a user's finger, a stylus pen, and the like.

The printer engine 53 is configured to execute a printing operation to print images on a recording medium such as a sheet or a disk. A recording method of the printer engine 53 may be an inkjet method in which ink is ejected onto the recording medium, or an electrophotographic method in which a toner image is formed on a photosensitive member and the formed toner image is then transferred onto the recording medium. The scanner engine 54 is configured to perform a scanning operation to scan an image formed on an original sheet and generated scan data representing the scanned image. The controller 56 of the MFP 50 causes the scanner engine 54 to scan the document set on an ADF (Auto Document Feeder) or a scanning table to generate the scan data. The generated scan data can be transmitted to the server 30 or the terminal 10 via the communication IF 52. The MFP 50 may also be configured to execute a composite operation combining multiple operations. A copying operation combining a printing operation by the printer engine 53 and a scanning operation by the scanner engine 54 is an example of a composite operation.

In the present embodiment, it is possible to have the MFP 50 perform a push scan process and a pull scan process as scanning operations to be performed by the MFP 50. The push scan process is a process that causes the MFP 50 to generate the scan data and upload the generated scan data to the service providing server 30 upon receiving an instruction from the user via the user IF 55 to execute a scanning operation. The scan data uploaded to the service providing server 30 can be downloaded by operating the terminal 10. The pull scan process is a process in which the terminal 10 transmits, upon receiving an instruction to execute a scanning operation from a user via the user IF 13 of the terminal 10, the instruction to execute the scanning operation to the MFP 50. Then, the MFP 50 generates the scan data in response the instruction, and transmits the generated scan data to the terminal 10.

The controller 56 includes a CPU, an ASIC (Application Specific Integrated Circuit), and the like, and is configured to control each operation of the printer engine 53, the scanner engine 54, and the user IF 55. The memory 57 is configured to store various programs to be executed by the controller 56.

In present embodiment, the memory 57 includes a combination of, for example, a RAM, a ROM, and a flash memory. The memory 57 may be a computer-readable storage medium that can be read by the controller 56 (the controller 56 serving as a computer). The storage medium includes recording media such as a CD-ROM and a DVD-ROM. The same applies to memory 15, which will be described below.

A control program 40 is stored in the memory 57. By executing the control program 40, the controller 56 can perform each of the above-mentioned operations, such as the scanning and printing operations. Capability information 41, management information 42 (see FIG. 2), shortcut information 43 (see FIG. 3), log information 44, and history information 45 are also stored in the data storage area of the memory 57 as data to be referenced by the controller 56.

The capability information 41 includes a plurality of items indicating the performance of the MFP 50. The capability information 41 is, for example, in a structure form. In the capability information 41, as items related to the scanning operation, "document size," "resolution," "color setting," "scanning format," and "file format" are stored. The "document size" is the information that indicates a scanning range of the document when the MFP 50 performs the scanning operations. For example, "A4" indicates that the document is scanned with a scanning range of A4 size, and "Auto" indicates that the scanning range can be adjusted automatically according to the document. The "resolution" indicates the resolution of the scan data when the scanning operation is executed. The "color setting" is the information to set the color of the scan data when the MFP 50 performs the scanning operation, and includes, for example, "color" and "monochrome." For example, "color" and "monochrome" are included. The "scan format" is information that indicates the scanning surface (double-sided or single-sided) of the document when the MFP 50 performs scanning. The "file format" is information indicating the file format (JPEG, TIFE) of the scan data when the MFP 50 performs the scanning operation. The items of an "ADF tilt correction," "brightness," "contrast," and "blank paper removal" may also be included as items of the capability information 41.

Figure 2:
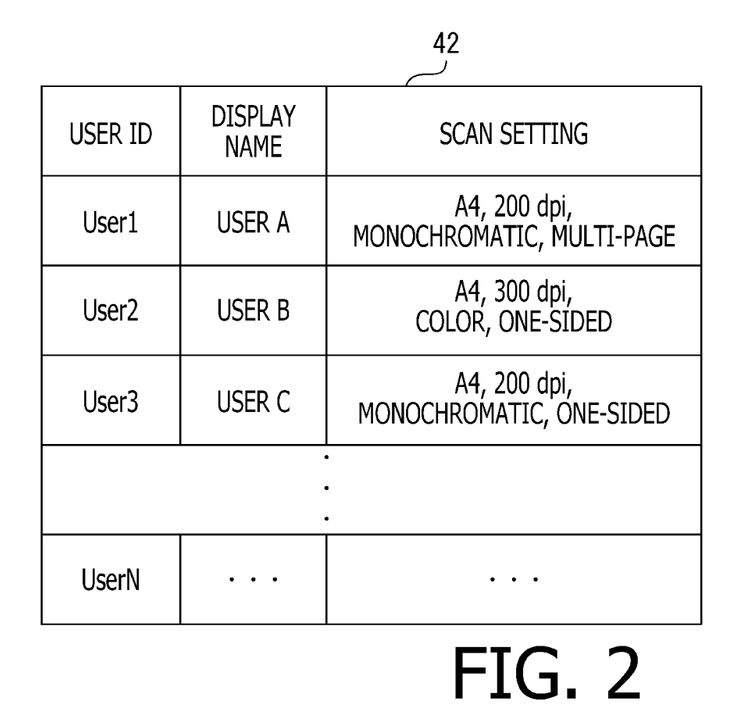
FIG. 2 illustrates an example of management information.
Figure 3:
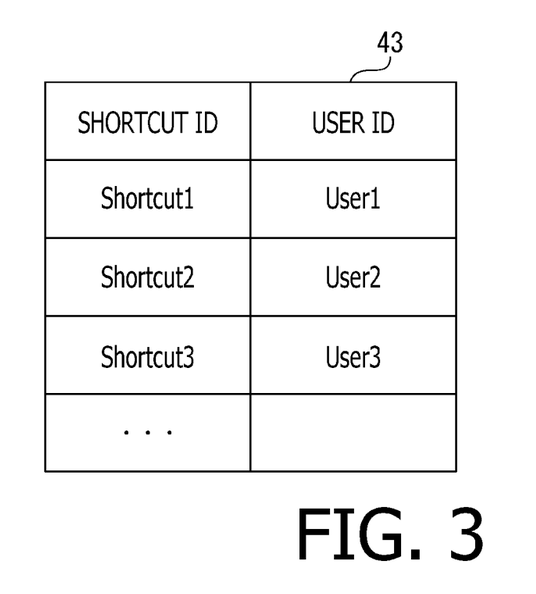
FIG. 3 illustrates an example of shortcut information.

The management information 42 stores various information about the destination in the push-scan process. In the present embodiment, as shown in FIG. 2, the management information 42 includes items of "user ID," "display name," and "scan settings." Among the items of the management information 42, the "user ID" is information assigned to manage a device that is the destination on the scanning system 100. The "display name" is information that indicates a display name when the destination is displayed on the user IF 55 of the MFP 50. The "scan settings" are scan settings for executing the push scan process for the destination, and can be set within a range indicated by the capability information 41. In addition to the above, the management information 42 may also include identification information that identifies the destination device, such as a MAC address of the device and a program ID of the control program 40. The shortcut information 43, the log information 44 and the history information 45 will be described later.

Next, the servers 30, 31 and 32 will be described. Each of the servers 30, 31 and 32 has a CPU serving as a computer, a communication IF, and a memory. The server 30 is a service providing server to which the scan data generated by the push-scan process by the MFP 50 is uploaded. The service providing server 30 is configured to have the uploaded scan data to be downloaded to the terminal 10 in response to instructions from the terminal 10. The server 31 is an information collection server configured to manage the management information 42.

The server 32 is a push notification server configured to transmit push notifications to the destination device when scan data is uploaded to the service providing server 30. As an example of a mechanism for the push notification server to provide push notifications, APNS (Apple Push Notification Service) and GCM (Google Cloud Messaging for Android) can be used. In the present embodiment, when using the services of APNS or GCM, the push notification server 32 registers the address indicating the location of the destination device as notification information in association with the push notification ID, and the destination device is assumed to have obtained the push notification ID from the push notification server 32. A push notification is a notification according to the protocol of APNS or GCM. The "push notification ID" is information that identifies the destination when the push notification is performed.

The terminal 10 is a smart phone or a tablet terminal. The terminal 10 is equipped with a bus 11, a terminal-side CPU 12, a user IF 13, a communication IF 14, and a memory 15.

These components are connected to each other via the bus 11 to enable communication thereamong.

The user IF 13 has the same configuration as the user IF 55 of the MFP 50, and is equipped with a touch panel and operation keys. The communication IF 14 has the same configuration as the communication IF 14 of the MFP 50. The communication IF 14 may be configured to perform a wireless communication using a mobile communication system via a base station.

The terminal-side CPU 12 controls each component of the terminal 10 by executing the program stored in the memory 15. The memory 15 stores an OS 20 (Operating System), an application 21, and a browser program 22. In the following description, the application program is abbreviated as "application." The CPU that executes the program may also be referred to simply by the program name. For example, a statement "the application 21 performs . . . " may mean "the terminal-side CPU 12 that executes the application 21 performs . . . ."

In the present embodiment, the description is mainly made based on the process performed by the CPU according to the instructions described in the program. That is, "decision," "extraction," "selection," "calculation," "determination," "identification," "acquisition," "obtaining," "reception," "control," and the like in the following description represent processes performed by the CPU or the controller. The processes performed by the CPU also include hardware control via the OS 20. It is noted that the term "acquisition" and "obtaining" are used in a concept that do not require a request. In other words, the process of receiving data without a request by the application 21 is also included in the concept of "acquisition of data by the CPU" or "obtaining of data by the CPU." Further, "data" in the specification is assumed to be expressed in a computer-readable format. Further, data with the same substantive meaning content but different formats will be regarded as the same data. The same applies to the term "information" in this specification.

The OS 20 has an API (Application Programming Interface) that enables the application 21 to use functions provided by the OS 20, to communicate with the servers 30, 31, 32 and the MFP 50, and to use the functions of other programs. The application 21 instructs the MFP 50, which can be connected via the communication IF 14, to perform printing operations, scanning operations and the like, through the functions of the OS 20. The browser program 22 can display web page data transmitted from the MFP 50 by communicating with the MFP 50, the servers 30, 31 or 32.

Next, referring to FIG. 4, the process for registering a new destination in the management information 42, which is executed between the terminal 10, the servers 30, 31 and the MFP 50, will be described. In each of the processes shown in FIG. 4, the process performed in the terminal 10 is executed by the application 21, and the process performed in the MFP 50 is executed by the control program 40. It is noted that the network connection between the terminal 10, the MFP 50, and the servers 30, 31 is assumed to have been established.

In step S11, the application 21 displays a registration screen on the user IF 13 and receives input operations by the user via the user IF 13. The registration screen is a screen enabling the user to register the information of the terminal 10 to the management information 42, which is input by the user. The application 21 designates the MFP 50 on the registration screen displayed by the user IF 13, and receives input operations to input the display name and the scan settings as information about the destination (i.e., the terminal 10) to be newly registered.

In S12, the application 21 transmits the device ID of the MFP 50, the display name and scan settings for which input was received in S11, and the push notification ID of the device itself as the destination of the push scanning process of the MFP 50 to the service providing server 30 together with the registration request. The device ID is information to identify the MFP, which the application 21 may have been obtained in advance from, for example, the MFP 50. In S13, the service providing server 30 performs an update process to store each information transmitted from the terminal 10 in the management information 42. Concretely, a user ID is assigned to the destination to be registered, and the display name and the scan settings related to the destination are associated with this user ID and stored. In the present embodiment, an upper limit is set for the number of user IDs that can be managed with use of the management information 42. For example, in the management information 42 shown in FIG. 2, information (display name and scan settings) related to the device that is the destination can be associated and stored for N user IDs (N being an integer of 1 or more) from "User1" to "UserN." When a new destination is registered, a user ID to which no information about the device is associated is assigned from among the N user IDs, and information about the destination is stored for the assigned user ID. Although not shown in FIG. 2, the management information 42 stored in the service providing server 30 stores, in association with the user ID, the push notification ID transmitted from the device that is the destination and the device ID. In the present embodiment, the user ID is an example of the destination information.

In S14, the service providing server 30 transmits the management information 42 updated in S13 to the information collection server 31 together with the device ID. In the present embodiment, the service providing server 30 transmits the management information 42, to which the information of the newly destination device has been added, to the information collection server 31 in a batch. In S14, the service providing server 30 may transmit a URL indicating the address of its own device to the information collection server 31 together with the management information 42.

In S15, the information collection server 31 transmits the updated management information 42 and the device ID transmitted from the service providing server 30 to the MFP 50 as they are. The device ID may be stored in the memory 57 of the MFP 50 in advance in S15, prior to the process shown in FIG. 4.

When the control program 40 of the MFP 50 receives the updated management information 42 transmitted from the information collection server 31, the control program 40 performs a destination storing process in S16. In the destination storing process, the control program 40 overwrites the management information 42 currently stored in the memory 57 with the received updated management information 42, thereby updating the management information 42 in a batch. As a result, the control program 40 registers the terminal 10 as a destination for the push-scan process. In the management information 42 stored in the memory 57 of the MFP 50, the device ID transmitted from the information collection server 31 is stored in association with the user ID.

Figure 5:
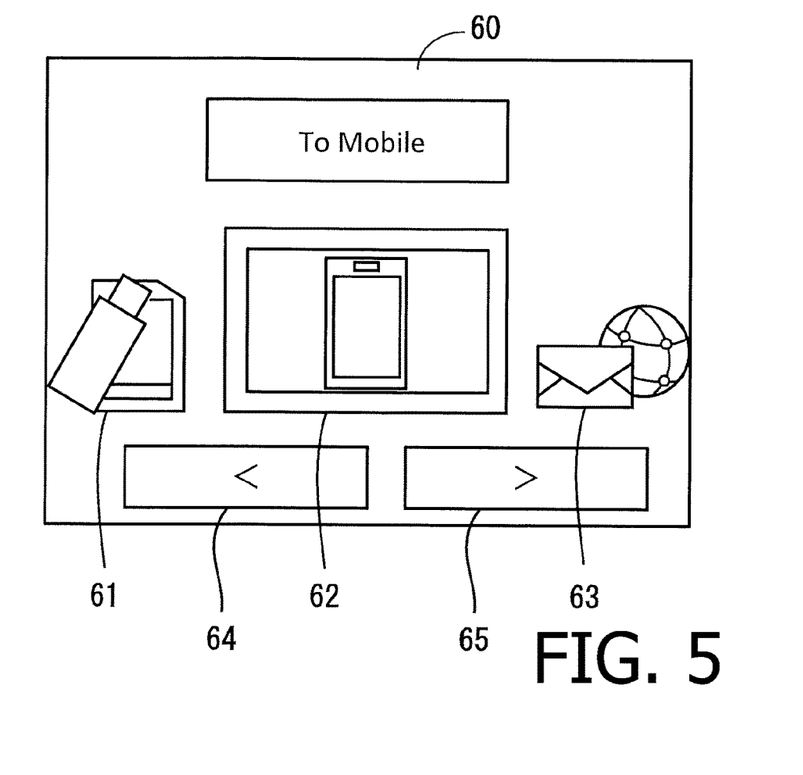
FIG. 5 illustrates an example of a function selection screen.

Next, a process of registering a shortcut key in the user IF 55 of the MFP 50 is described. When the user performs a designating operation to designate a scanning operation on the standby screen displayed on the user IF 55, in S17, the control program 40 displays various screens (see FIG. 5, FIG. 6, FIG. 7) in response to the operation by the user. Concretely, first, the control program 40 displays the function selection screen 60 shown in FIG. 5 on the user IF 55.

The standby screen is a screen that is displayed on the user IF 55 in response to turning on of the main power of the MFP 50. The function selection screen 60 includes operation icons 61, 62 and 63 that receive the selection of individual functions among the scanning operations. Among the operation icons 61, 62 and 63, the operation icon 61 is an icon for receiving an instruction for a process of storing the scan data in an external memory connected to the MFP 50. The operation icon 62 is an icon that receives an instruction of transmitting the scan data to a registered destination (i.e., a push-scan process). The operation icon 63 is an icon that receives an instruction of transmitting scan data to a designated e-mail address. In the present embodiment, the operation icons 61 to 63 can be set to receive the user's designating operation by positioning the operation icons 61-63 at a central portion on the function selection screen 60 in accordance with the operation of changing icons 64 and 65. In the function selection screen 60 shown in FIG. 5, the operation icon 62 is set as an icon that can accept an instruction by the user.

Figure 6:
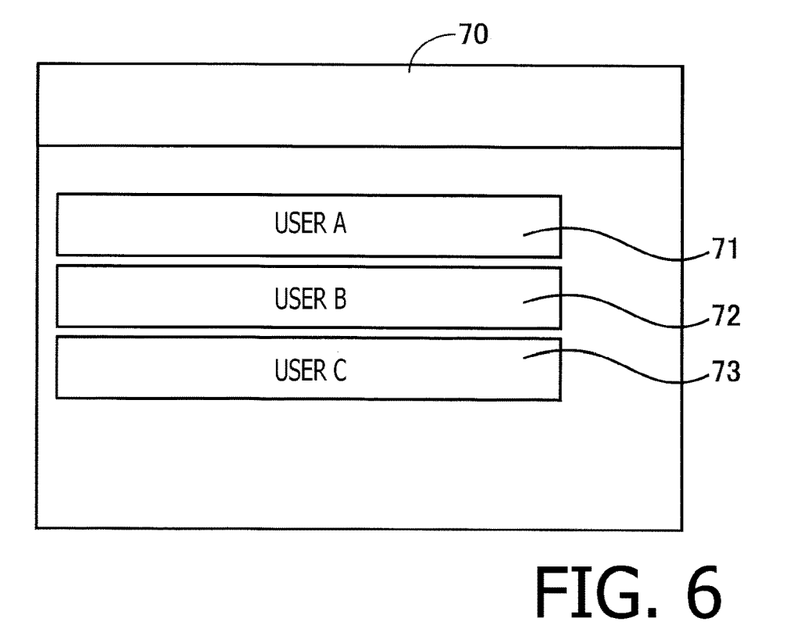
FIG. 6 illustrates an example of a destination display screen.

When the control program 40 detects that the operation icon 62 has been operated via the user IF 55, the control program 40 displays a destination screen 70 shown in FIG. 6 on the user IF 55. The destination screen 70 is a screen on which the display names stored in the management information 42 are displayed in a list. The destination screen 70 shown in FIG. 6 includes destination icons 71, 72 and 73 for receiving the designation of a destination. On the destination icons 71-73, corresponding display names (i.e., "User A," "User B," and "User C,") among the display names stored in the management information 42 are indicated, respectively.

Figure 7:
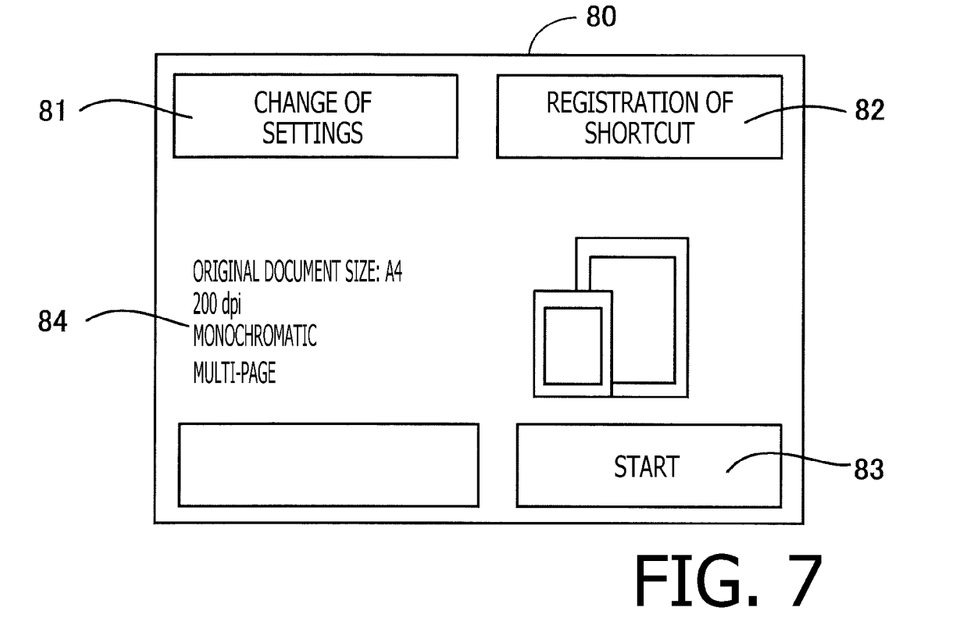
FIG. 7 illustrates an example of an execution screen.

When the control program 40 receives, via the user IF 55, a designating operation to designate any of the destination icons 71 to 73 included in the destination screen 70, the control program 40 displays a scan execution screen 80 shown in FIG. 7 on the user IF 55. It is noted that, when only information on one destination is stored in the management information 42, the scan execution screen 80 may be displayed without displaying the destination screen 70 when the operation icon 62 is operated.

The scan execution screen 80 is a screen that receives an instruction for executing the push-scan process for the destination designated on the destination screen 70. The scan execution screen 80 shown in FIG. 7 is the screen that is displayed when the destination icon 71 is operated on the destination screen 70. The scan execution screen 80 includes a setting change icon 81, a registration icon 82, a start icon 83, and a setting display area 84.

The setting display area 84 is an area for displaying the scan settings associated with the destination designated on the destination screen 70. In the present embodiment, each value of the scan settings stored in association with the user ID "User1" on the management information 42 is displayed in the setting display area 84. The setting change icon 81 is an icon that receives a designating operation by the user when changing the scan settings currently displayed in the setting display area 84. The registration icon 82 is an icon that receives a user's designating operation when registering a shortcut key for the destination designated on the destination screen 70. The start icon 83 is an icon that receives a user's designating operation when starting the push-scan process for the currently designated destination.

Figure 8:
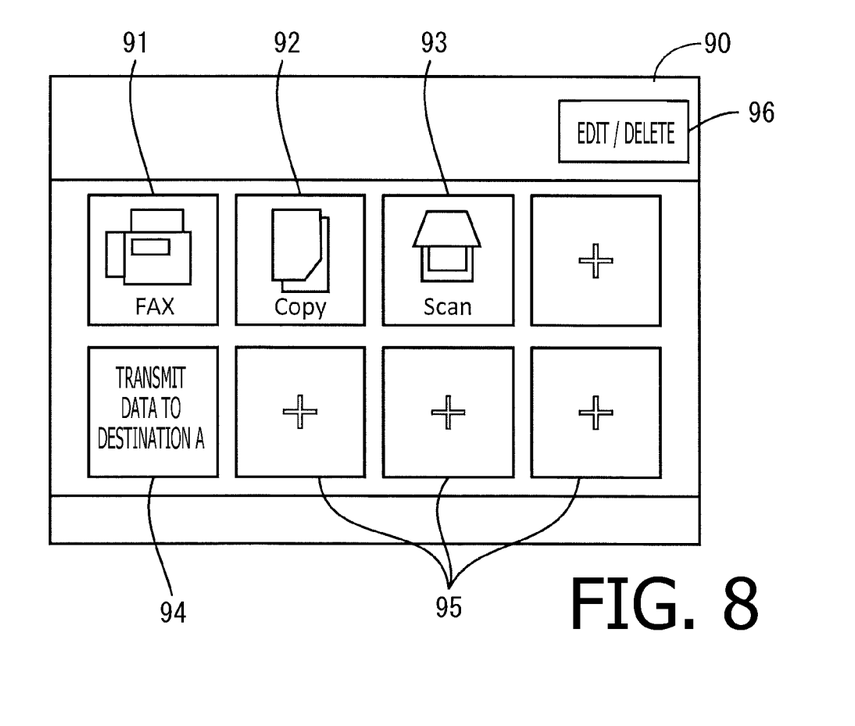
FIG. 8 illustrates a shortcut screen.

When the control program 40 receives the designating operation for the registration icon 82 on the scan execution screen 80, the control program 40 executes, in S18, an association process for associating a push-scan process for the designated destination with a shortcut key. As shown in FIG. 8, the shortcut key is a key that receives the execution operation for each process that can be executed by the MFP 50 on the shortcut screen 90. The shortcut screen 90 can be displayed on the user IF 55 instead of a standby screen.

Figure 4:
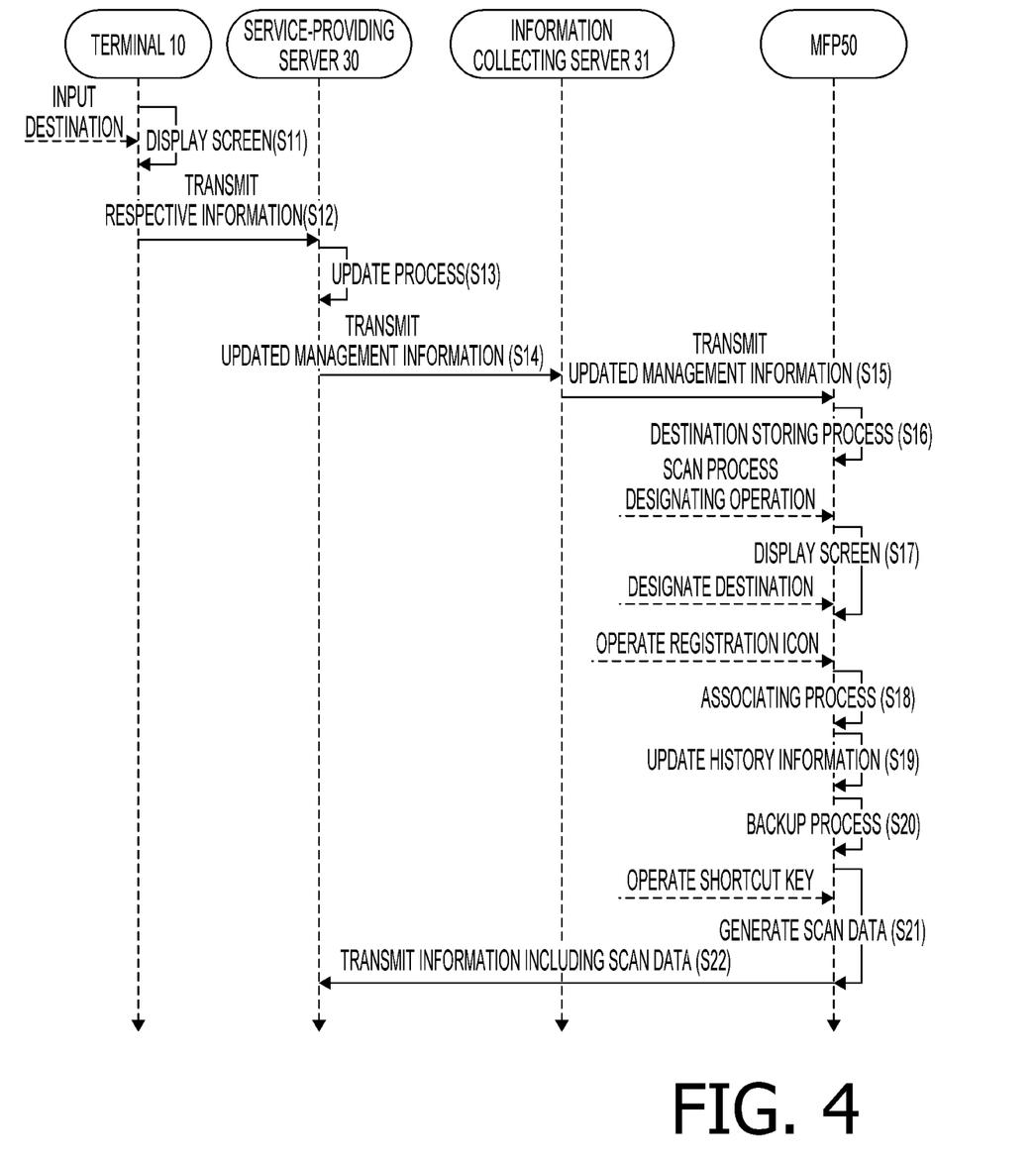
FIG. 4 is a sequence chart illustrating a procedure for registering a shortcut icon.
Figure 9:
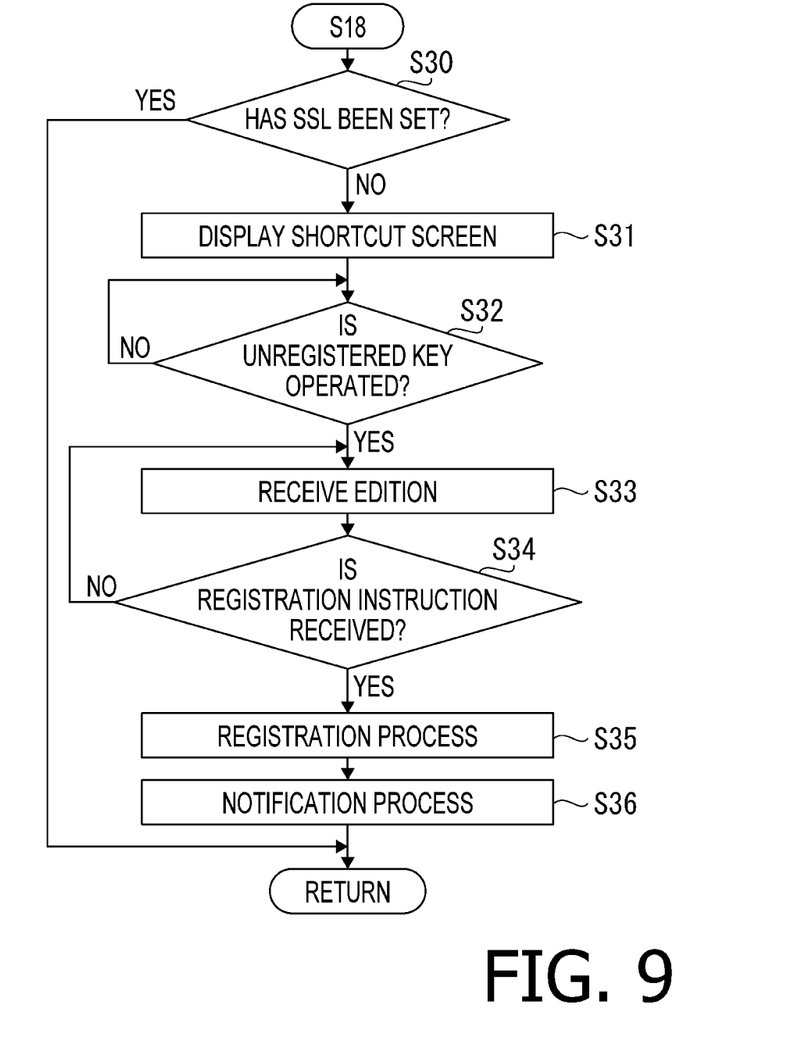
FIG. 9 is a flowchart illustrating an association process.

FIG. 9 shows the details of the process performed in S18 of FIG. 4. In S30, the control program 40 determined whether an SSL (Security Setting Lock) has been set for the MFP 50. The SSL is a lock to prohibit changes of various settings of the MFP 50. In the present embodiment, by the function of the Web server (hereinafter referred to as EWS: Embedded Web Server) which is realized by the control program 40, the setting of SSL can be changed on the EWS screen displayed on the user IF 13 of the terminal 10. When the SSL is set, the various settings of the MFP 50 are locked from being changed, and therefore, no new shortcut keys can be generated on the shortcut screen 90. Therefore, the control program 40 makes an affirmative decision in S30 (S30: YES) and terminates the process of FIG. 9. In such a case, the control program 40 may be configured to display a screen indicating that a shortcut key cannot be registered on the user IF 55.

On the other hand, when the SSL is not set, the control program 40 makes a negative decision in S30 (S30: NO), and in S31, the control program 40 displays the shortcut screen 90 on the user IF 55. According to the example shown in FIG. 8, the shortcut screen 90 includes shortcut keys 91, 92, 93, 94, an unregistered key 95, and an edit/delete key 96. In the following description, a case in which a shortcut key 94 is generated by associating the unregistered key with user ID "User 1" as an example. In the present embodiment, the unregistered key is an example of a disabled shortcut key.

In S32, the control program 40 determines whether the operation to designate an unregistered key is received via the user IF 55. When the designation of the unregistered key has not been received (S32: NO), the control program 40 waits. On the other hand, when it is determined that the designation of the unregistered key on the shortcut screen 90 is received (S32: YES), the control program 40 proceeds to S33. The user can set a display mode of the shortcut key after the registration by editing the designated unregistered key on the shortcut screen 90. In the present embodiment, as the process of S33 is performed, a text "Send data to destination A" is displayed on the shortcut key 94.

In S34, the control program 40 determines whether the registration instruction for the shortcut key on the shortcut screen 90 has been received. When the registration instruction for the shortcut key has not been received (S34: NO), the system waits for the receipt thereof. On the other hand, when the registration instruction for the shortcut key is received (S34: YES), the control program 40 proceeds to S35 and performs the registration process to associate the destination with the designated unregistered key. In the present embodiment, the shortcut key is registered by associating the user ID with the shortcut ID within the shortcut information 43 shown in FIG. 3. The shortcut ID is the information to identify the shortcut key. Concretely, in the present embodiment, the shortcut ID "Shortcut1" of the shortcut key 94 is associated with "User1", which is the user ID associated with the destination terminal 10. By associating the shortcut ID with the user ID on the shortcut information 43, the unregistered key serves as a shortcut key.

In S36, the control program 40 performs a notification process to notify that a new shortcut key has been registered. The process of S36 may be, for example, one in which the control program 40 displays a notification screen on the user IF 55, or one in which the EWS function transmits web page data for notification to the terminal 10. Alternatively or optionally, the control program 40 may perform notification by instructing the service providing server 30 to perform a push-notification using the push notification server 32, thereby transmitting the notification to a terminal of which user ID is "User1." After completing the processing of S36, the control program 40 proceeds to S19 of FIG. 4.

In S19, the control program 40 updates the history information 45. Concretely, the shortcut ID, user ID, and the time when the shortcut key 94 was registered corresponding to the shortcut key 94 registered this time are stored in the history information 45.

In S20, the control program 40 performs a backup process to update the log information 44. Concretely, the control program 40 stores the management information 42 and shortcut information 43 after the process of S18 in the log information 44.

When the shortcut key 94 registered this time is operated, the control program 40 controls the user IF 55 to display the scan execution screen 80 targeting the destination associated with the user ID "User1." When the operation of the start icon 83 on this scan execution screen 80 is received, the control program 40 generates the scan data by controlling the scanner engine 54 to read the original document set on the reading table at S21. In the present embodiment, the scan data may include a thumbnail image, a label name, a model name, a date and time of execution, and a data size, in addition to the image data generated by reading the original document. The label name is information that identifies the scan data and is set by the control program 40 when the scan data is generated. The model name is the name of the device that performed the push-scan process, and in the present embodiment, the mode name is the model name of the MFP 50. The execution date and time is the information indicating the date and time when the push-scan process was executed. When the user touch-operates the icon to cancel the execution of the scanning operation, the control program 40 does not execute the scanning operation.

In S22, the control program 40 transmits the generated scan data to the service providing server 30. At this stage, the control program 40 transmits the user ID associated with the shortcut key to the service providing server 30 along with the scan data. It is noted that the control program 40 is assumed to have registered the URL of the service providing server 30 in advance.

When the service providing server 30 receives the scan data transmitted from the MFP 50, the service providing server 30 uploads the scan data to its memory. At this time, the service providing server 30 stores the label name, model name, execution date and time, data size, and thumbnail image contained in the scan data in association with the transmitted user ID in the job management table for managing the scan data.

The service providing server 30 transmits a push notification ID and a URL that designates the upload destination of the scan data along with a request for sending a push notification to the push notification server 32. The push notification ID transmitted from the service providing server 30 is the push notification ID corresponding to the user ID of the destination (in this embodiment, the terminal 10).

When the push notification server 32 receives a request to send the push notification, the push notification server 32 refers to the address of the device (in this case, the terminal 10) associated with the push notification ID in the notification information stored in the server 32 itself. Then, the push notification server 32 transmits the push notification to the referenced address. In the present embodiment, the push notification includes a URL that designating the upload destination of the scan data and web page data for displaying this URL on the screen.

When the application 21 of the terminal 10 receives the push notification, the application 21 displays a notification image, on the top screen, indicating that the push notification has been received. According to this configuration, the user operating the terminal 10 can confirm that the scan data destined for the terminal 10 has been uploaded to the service providing server 30. When the application 21 detects an operation on the notification image via the user IF 13, the application 21 causes the browser program 22 to display a download designating screen using the web page data included in the push notification. On the download designating screen, a URL that designating the upload destination of the scan data included in the push notification is displayed. When the application 21 receives an operation to designate the URL on the download designation screen, the application 21 transmits a request to download the scan data stored at the designated URL to the service providing server 30. At this time, a label name to identify the scan data may be transmitted along with the download request.

Figure 10:
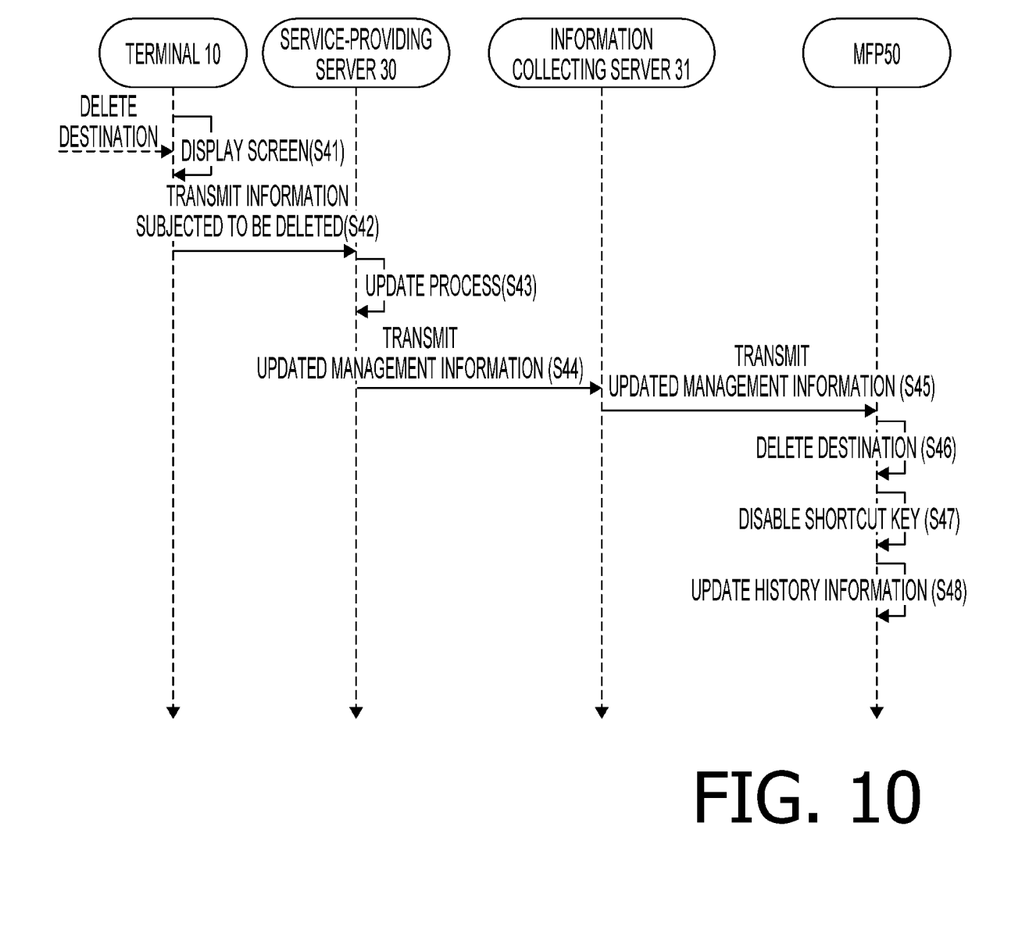
FIG. 10 is a sequence chart illustrating a procedure for releasing the association with a destination.

Next, a process that is performed when the information related to the destination stored in the management information 42 is deleted will be described with reference to FIG. 10. In S41, the application 21 of the terminal 10 displays a registration screen on the user IF 13, and receives a deletion operation of the destination by the user via the user IF 13. In the present embodiment, it is assumed that the deletion operation is received for the terminal 10 displayed by the display name "User A."

In S42, the application 21 transmits, to the MFP 50, information about the destination for which the deletion operation was received in S40 together with the deletion request. In S43, the service providing server 30 performs an update process to update the management information 42 using the information transmitted from the terminal 10. As a result, the user ID of the destination subjected to be deleted, the display name and the scan settings associated with this user ID are deleted from the management information 42 stored in the service providing server 30. Further, along with the deletion of the user ID, the push notification ID associated with this user ID is deleted.

In S44, the service providing server 30 transmits the updated management information 42 to the information collection server 31. In S45, the information collection server 31 transmits the management information 42 transmitted from the service providing server 30 to the MFP 50 as it is.

When the control program 40 of the MFP 50 receives the updated management information 42 transmitted from the information collection server 31, the control program 40 overwrites the management information 42 currently stored in the memory 57 with the updated management information 42 at S46. As a result, in the management information 42 stored in the memory 57, the user ID "User1" and the information associated with this user ID, such as the display name and scan settings, are deleted. In addition, the device ID associated with the user ID is also deleted.

Figure 11:
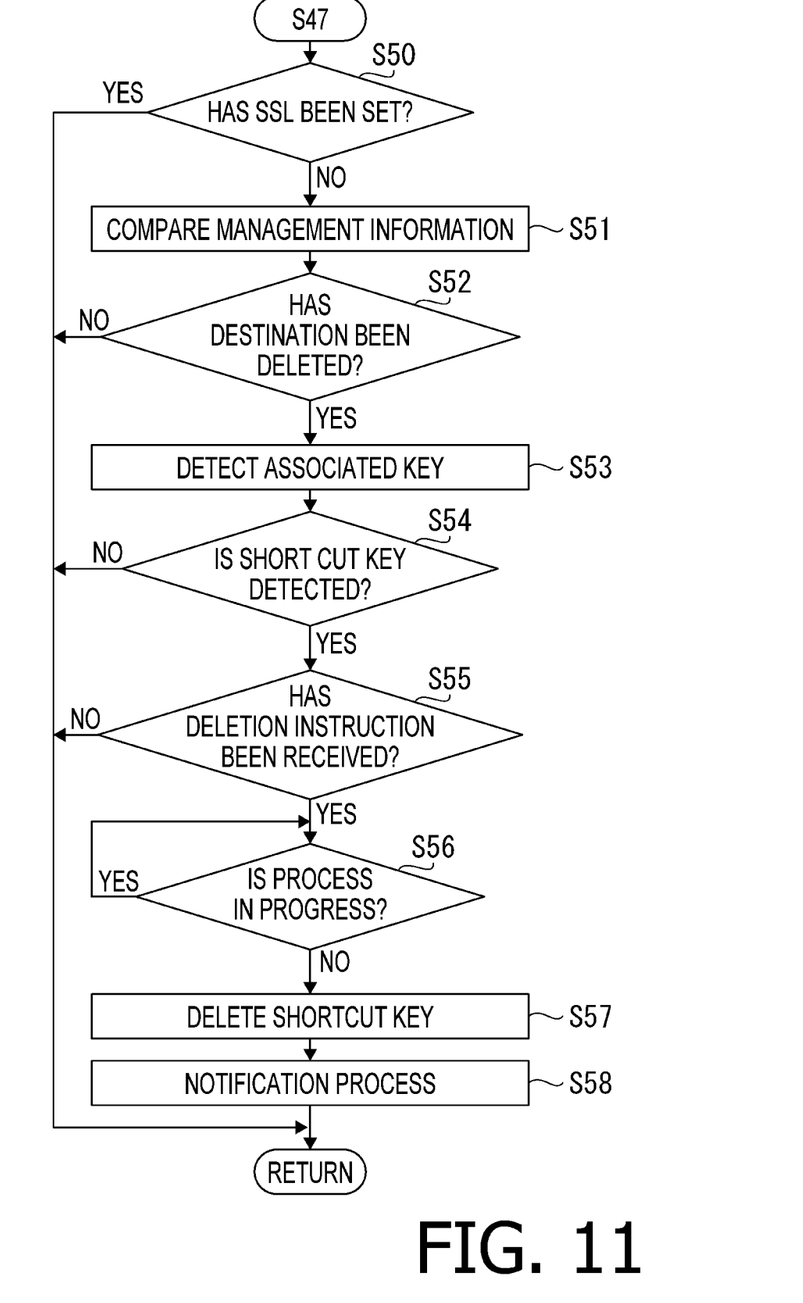
FIG. 11 is a flowchart illustrating a shortcut key disabling process.

In S47, a process of disabling the shortcut key associated with the user ID of the destination targeted to be deleted is performed. FIG. 11 shows a flowchart illustrating the process performed by the control program 40 in S47. In S50, the control program 40 determines whether the SSL is set. When it is determined that the SSL is set, since the various settings of the MFP 50 are locked, an affirmative decision is made in S50 (S50: YES) and the process in FIG. 11 is terminated. On the other hand, when it is determined that the SSL is not set (S50: NO), the control program 40 proceeds to S51.

In S51, the control program 40 compares the management information 42 stored in the log information 44 with the management information 42 updated this time in S46. In the present embodiment, since the management information 42 is updated in a batch, even if a new destination is registered for the same user ID after the deletion of the information on the destination, the display name stored in association with this user ID has been changed.

According to the comparison result of the management information 42 in S51, the control program 40 determines, in S52, whether the information about the destination has been deleted. When it is determined that the information about the destination has been deleted (S52: NO), since there is no shortcut key to be disabled, the process shown in FIG. 11 is terminated. When it is determined that the information about the destination has not been deleted (S52: YES), the control program 40 proceeds to S53.

In S53, the control program 40 detects the shortcut key associated with the user ID of the destination subjected to the deletion. Concretely, by referring to the shortcut information 43, the control program 40 detects the shortcut ID associated with the user ID of the destination subjected to the deletion. When the corresponding user ID does not exist in the shortcut information 43 (S54: NO), the process of FIG. 11 is terminated. When the corresponding shortcut ID is detected (S54: YES), the control program 40 proceeds to S55. In the present embodiment, the process executed by the control program 40 in S52 to S54 is an example of a determination process.

In S55, the control program 40 determines whether a deletion instruction from the user has been received. In the present embodiment, a screen inquiring whether to execute deletion of the shortcut key is displayed on the user IF 55 (S55). When the operation of the icon indicating the continuation of the display of the shortcut icon is received on this screen (S55: NO), the process of FIG. 11 is terminated. In this case, the shortcut key 94 is kept displayed on the shortcut screen 90. On the other hand, when the operation of the icon indicating the non-display of the shortcut icon is received on the screen (S55: YES), the control program 40 proceeds to S56.

In S56, the control program 40 determines whether the process corresponding to the operation of the designated shortcut key is in progress. When it is determined that the process corresponding to the operation of the designated shortcut key is in progress (S56: YES), the control program 40 waits until the process is completed. It is noted that the process corresponding to the operation of the shortcut key includes a process of displaying the scan execution screen 80 (FIG. 7) in response to operation of the shortcut key, and a process of performing the push-scan process in response to the operation of the start icon 83 on the scan execution screen 80. On the other hand, when the process corresponding to the designated shortcut key has been completed (S56: NO), the control program 40 proceeds to S57.

Figure 12:
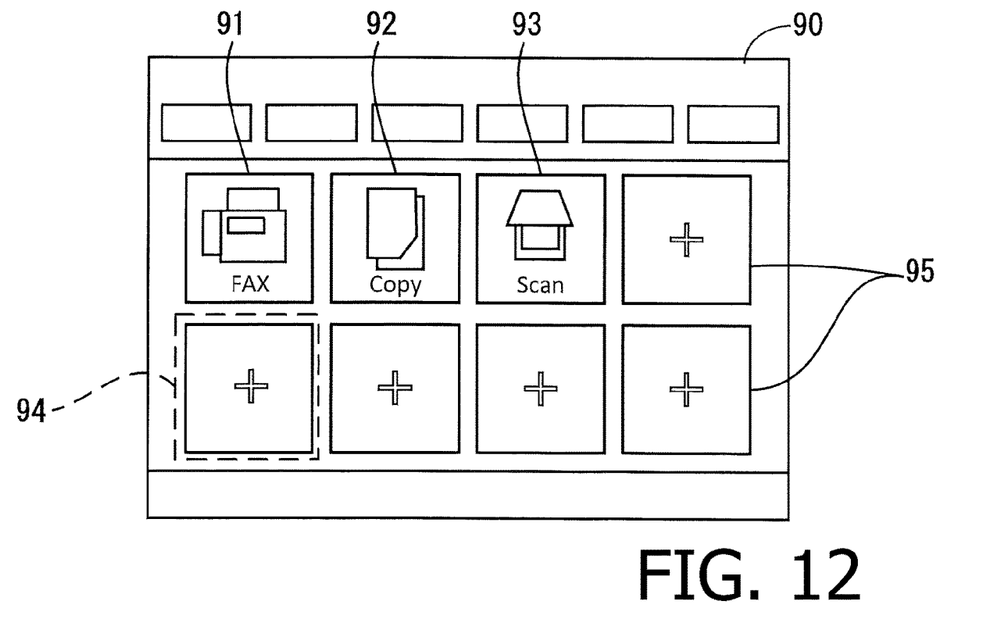
FIG. 12 illustrates a shortcut screen after a shortcut key has been deleted.

In S57, the control program 40 deletes the shortcut key which is associated with the corresponding shortcut ID detected on the shortcut information 43 in S53. Concretely, the control program 40 deletes the user ID "User1" associated, on the shortcut information 43, with the shortcut ID "Shortcut1". As a result, the shortcut key 94 is changed to an unregistered key. FIG. 12 shows the shortcut screen 90 after the shortcut key associated with the user ID "User1" has been deleted. On the shortcut screen 90, the shortcut key 94 corresponding to the push-scan process with the terminal 10 as the destination is changed to an unregistered key and is hidden. In the present embodiment, the process of S57 performed by the control program 40 is an example of a disabling process.

In S58, the control program 40 performs a notification process. The notification process is a process to notify the user by having the printer engine 53 of the MFP 50 print a text indicating that the shortcut key has been deleted. It is noted that, if the MFP 50 and the terminal 10 can communicate with each other via the network 200, the control program 40 may transmits information indicating that the shortcut key has been deleted to the terminal 10 by push notification and the like in the notification processing of S56. After completing the processing of S58, the control program 40 proceeds to S48 of FIG. 10.

In S48, the control program 40 updates the history information 45. When a shortcut key is deleted in S47, the control program 40 stores the shortcut ID, the user ID of the deleted shortcut key, and the time when the deletion was performed in the history information 45. Thereafter, the process of FIG. 10 is terminated.

According to the present embodiment as described above, the following effects can be achieved.

When the user ID corresponding to the destination is deleted, the control program 40 of the MFP 50 determines whether the shortcut key associated with the user ID subjected to be deleted has been deleted. When the control program 40 determines that the shortcut key has not been deleted, the control program 40 deletes the shortcut key. According to this configuration, it is possible to prevent shortcut keys that are not associated with the destination from remaining in the user IF 55 of the MFP 50, thereby suppressing deterioration of the usability of the user IF 55.

The control program 40 disables the shortcut keys by removing the same from the shortcut screen 90. According to this configuration, it is ensured that shortcut keys that are not associated with the destination are not displayed on the user IF 55, thereby preventing the user from accidentally operating the disabled shortcut key.

When it is determined that the shortcut key associated with the user ID has not been deleted, the control program 40 transmits a notification asking the user to determine whether or not to delete the shortcut key. When an instruction to delete the shortcut key is received, the control program 40 deletes the shortcut key from the shortcut screen 90. In this way, the shortcut key can be deleted from the shortcut screen 90 after taking into account the user's decision in response to the notification.

When the control program 40 receives an instruction operation to disable a shortcut key during the execution of a scanning process associated with the operation of the shortcut key subjected to deletion, the control program 40 does not delete the shortcut key until the scanning process is completed. According to this configuration, it can be possible to suppress an adverse effect due to the deletion of a shortcut key while the shortcut key subjected to deletion is being operated.

According to the present embodiment, the control program 40 does not delete shortcut keys that are not associated with destinations when the SSL is running. According to this configuration, it becomes possible to suppress changes under a situation where the administrator and/or others does not intend the changes when changes to the scanner settings via the user IF 55 are restricted.

The control program 40 notifies the user of the deletion of the shortcut key when deleted. According to this configuration, the user can recognize that the shortcut key has been disabled.

The control program 40 displays the shortcut key on the shortcut screen 90 when the shortcut key is registered in the association with the user ID. The control program 40 notifies the user that the shortcut key has been associated with a user ID. According to this configuration, it becomes possible to use the shortcut keys effectively, for example, when the number of shortcut keys that can be set is restricted.

The service providing server 30 updates the management information 42 in response to instructions from the terminal 10, and transmits the updated management information 42 to the MFP 50. The controller 56 determines, based on the update result for the management information stored in the memory 57, whether the information about the destination has been deleted. As a result, the configuration described above can be applied to the MFP 50 in which the information about the destination can be deleted in response to an operation of the terminal 10.

MODIFICATION OF THE FIRST EMBODIMENT

In the process of S47 according to the first embodiment described above, the deleted user ID, the deleted display name, or the deleted device ID may be restored. In such a configuration, in S47, when the control program 40 receives an instruction by the user to restore the information, the control program 40 may refer to the log information 44. Then, based on the referred log information 44, the control program 40 may re-store the once-deleted user ID, the once-deleted display name, or once-deleted device ID which associated with the user ID.

In the disabling process of S47 in the first embodiment described above, the shortcut key is deleted from the shortcut screen 90. Alternatively, the shortcut key corresponding to the deleted destination user ID may be disabled by maintaining the displayed status but not receiving the operation. In this case, the disabled shortcut keys can be distinguished from the non-disabled shortcut keys, for example, by displaying the same grayed out.

In the first embodiment described above, the scan settings are stored in the management information 42. Alternatively, the scan settings may not be stored in the management information 42. In such a case, the controller 56 of the MFP 50 may be configured to receive changes to the scan settings individually via the user IF 55 when performing push scanning. The control program 40 may not need to perform the update process of the history information 45 (see S19 in FIG. 4 and S48 in FIG. 10) or the backup process (see S20 in FIG. 4).

In the first embodiment described above, the user ID is stored in the management information 42. Alternatively, the push notification ID may be stored in the management information 42 in place of the user ID. In such a case, the control program 40 uses the user ID stored in the memory 57 separately from the management information 42 to associate each information stored in the management information 42 with a destination.

SECOND EMBODIMENT

In the description of a second embodiment, the configuration that differs from that of the first embodiment will be mainly described. In the second embodiment, the same reference numbers/symbols are used for the parts same as in the first embodiment, and the description thereof will not be repeated.

In the first embodiment, the shortcut key is deleted from the shortcut screen 90 in the disabling process. Instead, in the present embodiment, the shortcut key is disabled by displaying the shortcut key grayed out on the shortcut screen 90.

Figure 13:
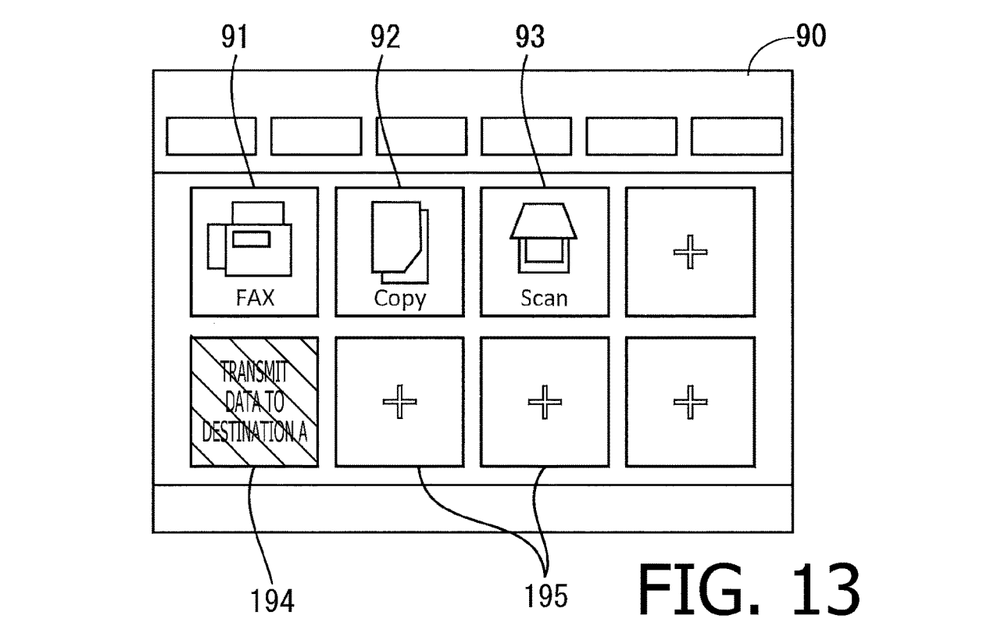
FIG. 13 illustrates a shortcut screen according to a second embodiment.

FIG. 13 shows the shortcut screen 90 according to the present embodiment. A shortcut key 194 is a key that has been disabled in S47 of FIG. 10. In the present embodiment, the shortcut key 194 is displayed grayed out, unlike the other shortcut keys. In other words, unlike the first embodiment, in the second embodiment, the shortcut keys are not immediately deleted from the shortcut screen 90.

Figure 14:
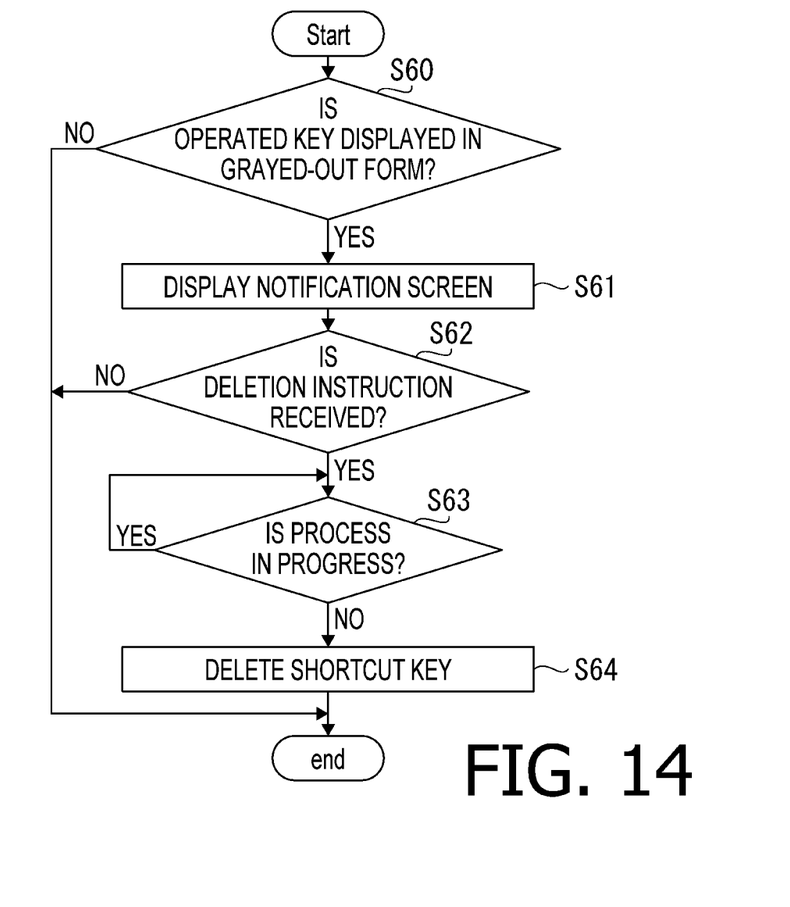
FIG. 14 is a flowchart illustrating a process when a disabled shortcut icon is operated.

FIG. 14 is a flowchart showing a process executed by the control program 40 when the disabled shortcut key shown in FIG. 13 is operated. In S60, the control program 40 determines whether the operated key is a shortcut key which is grayed out. When it is determined that the operated key is in a normal display form (S60: NO), the process shown in FIG. 14 is terminated. In this case, the control program 40 executes the processes corresponding to the operated key in parallel.

When it is determined that the operated key is in the grayed-out form (S60: YES), the control program 40 displays a notification screen to ask the user to determine whether or not to delete the shortcut key. In S62, the control program 40 determines whether the deletion instruction is received on the notification screen. When the operation of the icon indicating the continuation of the display of the shortcut icon is received on the notification screen (S62: NO), and the control program 40 terminates the process of FIG. 14. In this case, the shortcut key 194 is kept displayed on the shortcut screen 90 in a grayed-out state. On the other hand, when the operation of the icon indicating the hiding of the shortcut icon is received on the notification screen (S62: YES), the control program 40 proceeds to S63.

In S63, the control program 40 determines whether the process corresponding to the operation of the designated shortcut key is in progress. When it is determined that the operation of the designated shortcut key is in progress (S63: YES), the system waits until the process is completed. On the other hand, when the processing corresponding to the designated shortcut key has already been completed (S63: NO), the control program 40 proceeds to S64.

In S64, the control program 40 deletes the grayed-out shortcut key from the shortcut screen 90. In this case, the corresponding shortcut key is deleted from the shortcut screen 90 by changing the same to an unregistered key. After completing the process of S64, the control program 40 terminates the process of FIG. 14.

In the present embodiment described above, by receiving the presence or absence of a deletion instruction by the user after the shortcut key is grayed out, it becomes possible to prevent the unintentional deletion of the shortcut key from the shortcut screen 90.

OTHER EMBODIMENTS

The technology disclosed herein is not limited to the above-described embodiments, but can be modified into various forms to the extent that it does not deviate from aspects of the present disclosures.

For example, the following modifications are possible. In each of the above-mentioned embodiments and modifications, the disabling process for the corresponding shortcut key was performed after deletion of the information about the destination. Alternatively, the disabling process for the corresponding shortcut key may be performed prior to release of the information about the destination. In such a case, in FIG. 10, when the control program receives the updated management information 42, the control program 40 executes the disabling process of S47 prior to the process of S46. After that, the process of S46 may be executed.

In each of the above-mentioned embodiments, the explanation was given using the push-scan process performed by the MFP 50 as an example. Alternatively, when the MFP 50 performs the process of transmitting the scan data to the designated email address, the shortcut key may be disabled depending on whether the email address as the destination information has been deleted. In this case, when the email address is deleted in S46 of FIG. 10, the control program 40 may disable the shortcut key associated with the deleted email address in S47. In addition, when the MFP 50 performs the process of transmitting the scan data to a designated FTP server, the shortcut key may be disabled depending on whether the address of the designated FTP server has been deleted or not.

In the above-mentioned embodiments, the user ID was used as an example as the destination information. Alternatively, the serial number of the device, the program ID that identifies the application 21, or even the push notification ID may be used as the destination information. In such a case, in S16 of FIG. 4, the control program 40 may be configured to store at least one of the serial number, program ID, and push notification ID included in the information on the destination transmitted from the server in the management information 42.

In each of the above-mentioned embodiments and modifications, the shortcut key is an icon displayed on the shortcut screen 90. Instead, the operation keys 59, which are physical keys possessed by the user IF 55, may be used as the shortcut keys. In this case, the control program 40 can disable the shortcut key by not receiving the signal even if the shortcut key is operated in S47.

Throughout the description, the MFP 50 is referred to as an embodiment of a scanner. It should be noted that the scanner may be embodied by a device equipped only with scanning operations.

What is claimed is:

1. A scanner configured to scan an image of an original document and generate scan data representing the image of the original document, comprising:
a memory;
a user interface;
a communication interface; and
a controller,
wherein the controller is configured to perform:
storing, in the memory, at least one piece of destination information corresponding to a destination of the scan data;
associating a particular destination information among the at least one piece of destination information stored in the memory with a shortcut key provided to the user interface;
when the shortcut key is operated, transmitting the scan data as generated to a destination corresponding to the particular destination information associated with the shortcut key;
communicating with a server via the communication interface, the server being configured to store the at least one piece of destination information, update a destination information in response to instruction received from a terminal, and transmit the updated destination information to the scanner, and
receiving the updated destination information transmitted form the server;
comparing the received updated destination information and the at least one piece of destination information stored in the memory; and
determining whether particular destination information among the at least one piece of destination information stored in the memory is deleted based on a comparing result of the received updated destination information and the at least one piece of destination information stored in the memory;
determining whether a particular shortcut key is associated with the deleted destination information;
when the particular shortcut key is associated with the deleted destination information, determining whether the particular shortcut key associated with the deleted destination information is disabled; and
when it is determined that the particular shortcut key is not disabled, disabling the particular shortcut key.

2. The scanner according to claim 1,
wherein the user interface has a display,
wherein the particular shortcut key is an icon displayed on the display, and
wherein, in the disabling, the controller is configured to disable the particular shortcut key by removing the icon of the particular shortcut key from the display.

3. The scanner according to claim 1,
wherein, in the disabling, the controller is configured to perform:
when it is determined that the particular shortcut key associated with the destination information is not disabled, inquiring whether the particular shortcut key is to be disabled; and
disabling the particular shortcut key in response to receipt of an instruction to disable the particular shortcut key.

4. The scanner according to claim 3,
wherein, in the disabling, the controller is configured to perform:
when receiving an instruction operation to disable the particular shortcut key during the scanning process in response to the operation of the particular shortcut key subjected to disabling, disabling the particular shortcut key after the scanning process is completed.

5. The scanner according to claim 1,
wherein the controller is configured to perform:
restricting changes of settings of the scanner in accordance with instructions received through the user interface; and
in the disabling, when it is determined that the particular shortcut key associated with the destination information is not disabled, and when the changes of the settings of the scanner are restricted, not disabling the particular shortcut key.

6. The scanner according to claim 1,
wherein the controller is configured to notify the disabling of the particular shortcut key when the particular shortcut key is disabled in the disabling.

7. The scanner according to claim 1,
wherein the controller is configured to store association of the destination information with the particular shortcut key in the memory as backup information.

8. The scanner according to claim 1,
wherein, when the disabled particular shortcut key is associated with new destination information, the controller is configured to perform:
  releasing disabling of the particular shortcut key which is associated with the new destination information; and
  notifying that the disabled particular shortcut key is associated with the new destination information.

9. The scanner according to claim 1,
wherein, the controller is configured to store, in the memory as history information, one of a first case where the destination information and the particular shortcut key are associated with each other, a second case where the particular shortcut key is disabled, and both of the first case and the second case.

10. A non-transitory computer-readable recording medium for a scanner that is configured to scan an image of an original document and generate scan data representing the image of the original document, the scanner having a memory, a user interface, and a controller,
wherein the recording medium contains instructions which cause, when executed by the controller, the scanner to perform:
  storing, in the memory, at least one piece of destination information corresponding to a destination of the scan data;
  associating a particular destination information among the at least one piece of destination information stored in the memory with a shortcut key provided to the user interface;
  in response to operation of the shortcut key, transmitting the scan data as generated to a destination corresponding to the particular destination information associated with the shortcut key;
  communicating with a server via the communication interface, the server being configured to store the at least one piece of destination information, update a destination information in response to instruction received from a terminal, and transmit the updated destination information to the scanner, and
  receiving the updated destination information transmitted form the server;
  comparing the received updated destination information and the at least one piece of destination information stored in the memory; and
  determining whether particular destination information among the at least one piece of destination information stored in the memory is deleted based on a comparing result of the received updated destination information and the at least one piece of destination information stored in the memory;
  determining whether a particular shortcut key is associated with the deleted destination information;
  when the particular shortcut key is associated with the deleted destination information, determining whether the particular shortcut key associated with the deleted destination information is disabled; and
  when it is determined that the particular shortcut key is not disabled, disabling the particular shortcut key.

11. A scanning system comprising a server and a scanner,
wherein the server comprises a first memory that stores at least one piece of destination information corresponding to a destination to which the scan data is to be transmitted, a first communication interface, and a first controller, the server being configured to store the at least one piece of destination information, update the destination information in response to instruction received from a terminal, and transmit the updated destination information to the scanner,
wherein the first controller is configured to perform:
  updating a particular destination information stored in the first memory in accordance with an instruction received from a terminal via the first communication interface, and
  transmitting the updated destination information to the scanner via the first communication interface,
wherein the scanner comprises a second communication interface, a second memory, a second controller, and a user interface, and
wherein the second controller is configured to perform:
  receiving the updated destination information from the server;
  storing the updated destination information in the second memory;
  associating the updated destination information stored in the second memory with a shortcut key included in the user interface;
  comparing the received updated destination information and at least one piece of destination information stored in the second memory;
  determining whether particular destination information among the at least one piece of destination information stored in the second memory is deleted based on a comparing result of the received updated destination information and the at least one piece of destination information stored in the second memory;
  determining whether a particular shortcut key is associated with the deleted destination information;
  when the particular shortcut key is associated with the deleted destination information, determining whether the particular shortcut key is disabled associated with the deleted destination information; and
  when determining that the particular shortcut key is not disabled, disabling the particular shortcut key.

\* \* \* \* \*